United States Patent Office 3,451,997
Patented June 24, 1969

3,451,997
MONOTHIO-PHOSPHATE ESTER CATALYSIS FOR PREPARATION OF RIBONUCLEOSIDE DERIVATIVES
Yasuo Fujimoto, Machida-shi, Tokyo-to, Japan, assignor to Kyowa Hakko Kogyo Company Limited, Tokyo, Japan
No Drawing. Filed Nov. 3, 1966, Ser. No. 591,704
Claims priority, application Japan, Nov. 30, 1965, 40/73,135
Int. Cl. C08b 19/00
U.S. Cl. 260—211.5     5 Claims

ABSTRACT OF THE DISCLOSURE

The present invention relates to a process for the preparation of 2',3'-O-substituted ribonucleoside, and for selective phosphorylation at the 5'-position thereof by the use of a monoester of phosphorothioic acid as a catalytic agent.

---

Our U.S. Patent No. 3,201,389 (Ser. No. 310,879) describes and claims a process for selectively introducing a phosphate group into the 5'-position of a ribonucleoside by protection of the 2'- and 3'-positions thereof by condensation with an aldehyde or ketone in the presence of a phosphorus compound selected from organic phosphate monoesters, phosphoric acid and condensed phosphoric acids and halides thereof, metaphosphoric acid, and phosphorus pentoxide as catalyst, and subsequently phosphorylating at the 5'-position of the ribonucleoside without separating the ribonucleoside and the phosphorus compound.

We have now found that an organic ester of phosphorothioic acid, the organic group being attached to the sulphuratom, can be used as catalyst in the first stage of the reaction, namely introduction of the protecting group by condensation with an aldehyde or ketone to block the 2'- and 3'-positions.

According to the invention, therefore, we provide a process for selectively phosphorylating the 5'-position of a ribonucleoside which comprises blocking the 2'- and 3'-positions of the ribonucleoside by reaction with an aldehyde or ketone capable of forming a dioxolane with the ribonucleoside in the presence of a monoester of phosphorothioic acid as catalyst for the blocking reaction, and thereafter phosphorylating the 5'-position of the 2',3'-blocked ribonucleoside without separation of the ribonucleoside and the phosphorothioate.

The phosphorothiolate conveniently has the formula

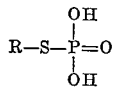

in which R represents an aliphatic, alicyclic or aromatic hydrocarbon radical which may have at least one substituent and/or at least one substituted or unsubstituted aliphatic, alicyclic, or aromatic hydrocarbon radical as a side chain. R preferably represents an alkyl group which may be substituted with a nitro or cyano group, an aryl group which may be substituted with a methyl, nitro or cyano group, a cycloalkyl group, or an aralkyl group which may be substituted with a nitro group, e.g., a methyl, ethyl, propyl, isopropyl, butyl, allyl, 2-propynyl, 2-cyanoethyl, 2-nitroethyl, 3-nitropropyl, cyclopentyl, cyclohexyl, phenyl, p-nitrophenyl, p-cyanophenyl, p-cresyl, benzyl, or p-nitro-benzyl group.

The process of the present invention can be conveniently applied for example to guanosine, adenosine, inosine, xanthosine, cytidine, uridine, nicotinamide ribonucleoside, or 5-amino-4-imidazole - carbox-amide or -amidine ribonucleoside.

The aldehyde or ketone used to provide the protecting group for the 2'- and 3'-positions of the ribonucleoside may be aliphatic, alicyclic, or aromatic, and conveniently has the structure

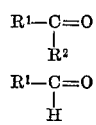

or

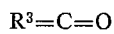

wherein $R^1$ and $R^2$, which may be the same or different, represent aliphatic, alicyclic, or aromatic groups and $R^3$ represents a polymethylene chain which may be substituted by aliphatic, alicyclic, or aromatic groups. In particular $R^1$ and $R^2$, which may be the same or different, may represent aliphatic, alicyclic, or aromatic hydrocarbon radicals including those having at least one substituent, and those having at least one substituted or unsubstituted aliphatic, alicyclic, or aromatic hydrocarbon radical as a side chain; and $R^3$ may represent the radical —$R^4$—$R^5$—, where $R^4$ and $R^5$, which may be the same or different, represent aliphatic hydrocarbon radicals which may have at least one substituent and/or at least one substituted or unsubstituted aliphatic, alicyclic, or aromatic hydrocarbon radical as a side chain.

Particularly preferred aldehydes and ketones include acetone, methyl ethyl ketone, methyl isobutyl ketone, methyl octyl ketone, propionaldehyde, butyraldehyde, p-tolualdehyde, benzaldehyde, chloroacetone, cyclopentanone, cyclobutyl methyl ketone, phenylacetaldehyde, diethyl ketone, or methyl propyl ketone.

The product of the first step of the reaction according to the invention is a 2',3'-O,O-disubstituted ribonucleoside of the formula:

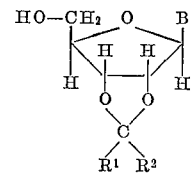

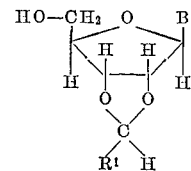

or

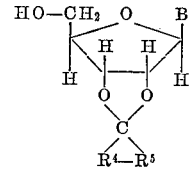

wherein B represents an organic base, e.g. a base selected from imidazoles, pyridines, pyrimidines and purines, and $R^1$, $R^2$, $R^4$ and $R^5$ are as hereinbefore defined. Then the phosphorylation at the 5'—OH of the ribonucleoside is carried out without isolating the 2',3'-O,O-disubstituted ribonucleoside or without removing the catalyst used in the 2',3'-O,O-disubstitution reaction. It is necessary only to remove any solvent from the reaction system for the following phosphorylation, and the phosphorothiolate monoester used as the catalyst in the 2′,3′-O,O-disubstitution can then be used again as the phosphorylating agent with only the addition of a suitable condensing agent, e.g., carbodiimides, diimidazoles, ketene-imides, cyanamides, nitriles, enamines, isocyanates, isoxazoles, or ketenes, and a suitable organic amine base which may be a heterocyclic compound e.g., pyridine or a derivative thereof, triethylamine, tripropylamine etc.

A dehydrating agent may be added to entrain water present in the reagents. Such dehydrating agents may react with water to form for example alcohols, esters, ketones or aldehydes, and their use does not necessitate the use of completely anhydrous starting materials and catalysts in the reaction, so ordinary commercial products may thus be used. These dehydrating agents may for example be compounds having a double bond conjugated with a carbonyl radical, e.g., mesityl oxide, compounds having a triple bond, e.g., diphenylacetylene, compounds having an alkoxy radical and double bond on the same carbon atom, for example, enol ethers, e.g., 2-methoxypropylene, compounds having two alkoxy groups on the same carbon atom, for example acetals (e.g., acetal itself) and ketals (e.g., 2,2-diethoxypropane), cyclic ethers, e.g., ethylene oxide, and orthoesters, e.g., ethyl orthoformate.

Next, one method of carrying out the process of the present invention will be briefly described by way of illustration only:

To a suitable amount, e.g., 1 to 50 litres (or 1 to 50 kg.) of an aliphatic, alicyclic, or aromatic carbonyl compound represented by the general formula:

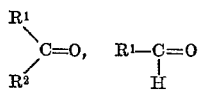

or

wherein $R^1$, $R^2$, $R^4$ and $R^5$ are as hereinbefore defined, there are added, with stirring, one equivalent of ribonucleoside and an adequate amount, usually 0.5 to 10 moles, of the monoester of phosphorothioic acid as catalyst. The catalyst, and the carbonyl compound, especially if solid, may be added to the reaction system in solution in a suitable solvent, e.g., alcohols, Cellosolves, N-substituted formamides, nitriles, dioxans, and chloroform. The 2′,3′-O,O-disubstitution is effected with the further addition, if desired, of an adequate amount, usually 0 to 20 moles, of the water-reactive compound described above by stirring at a suitable temperature, usually below the refluxing temperature of the reaction medium, for a convenient time, usually half-hour to several days, with exclusion of external moisture. (The order of addition of the reagents may not always be the order described; any convenient order may be used.) The 2′,3′-O,O-disubstituted ribonucleoside formed in the reaction mixture may be isolated as follows:

An excess of sodium bicarbonate, ammonium carbonate or an organic base can be added to the reaction mixture, which is then evaporated in vacuo to remove the solvent. The solid obtained is extracted with chloroform to yield the 2′,3′-O,O-disubstituted ribonucleoside. Alternatively, the catalyst is removed by treatment with an anion exchange resin and the 2′,3′-O,O-disubstituted ribonucleoside is crystallized. The actual isolation procedure will depend upon the ribonucleoside and catalyst used.

For the phosphorylation of the 2′,3′-O,O-disubstituted ribonucleoside formed, is used either the reaction mixture itself without the isolation of the ribonucleoside from the mixture, or the residue obtained by evaporating the solvent from the mixture under reduced pressure. If it is necessary to use a base in the phosphorylation, an adequate amount thereof may be added, before drying the mixture under reduced pressure.

The phosphorylation step is preferably carried out as follows. Using the phosphorothioate monoester as the catalyst, the residue may be completely dehydrated, for example, by repeating the dehydration procedure several times using azeotropic distillation of water with a solvent. The residual solid is dissolved for example in dioxans or pyridines and the solution is evaporated to dryness under reduced pressure. The dehydration procedure is repeated several times, and the residue is dissolved with stirring by adding an adequate amount, usually 5 to 50 litres, of a suitable solvent, for example, formamides, nitriles, alcohols, phenols, dimethylsulphoxide, dioxanes, and liquid organic amine bases including heterocyclic compounds such as pyridine, piperidine, pyrroles, pyrazines, pyridazines, pyrimidines, and morpholines. If desired, an adequate amount of a suitable organic base is added, usually 1 to 10 times the equivalent of the O,O-dihydrogen phosphorothioate monoester used, of a suitable condensing agent, e.g., carbodiimides, diimidazoles, ketene-imides, cyanamides, enamines, isocyanates, isoxazoles, ketenes, and nitriles, if desired in solution in a suitable solvent. The mixture is stirred or allowed to stand at a suitable temperature (usually 0 to 80° C.) for a convenient time (usually 0.5 hour to several days), and then a small amount of water is added to terminate the reaction. The mixture is then allowed to stand at room temperature for about one hour. In this step of the process, primary reaction products are present in the reaction mixture as the mixed diesters represented by the general formula:

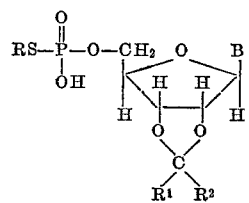

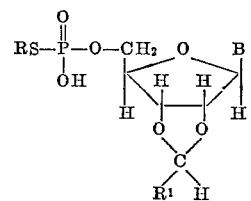

or

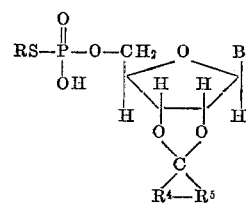

in which B, $R^1$, $R^2$, $R^4$, and $R^5$ are as hereinbefore defined.

Subsequently, the ribonucleoside-5′-phosphate or a salt thereof is obtained from the reaction mixture by suitable treatment, for example: the reaction mixture is oxidized by a halogen, the phosphorylated ribonucleoside is hydrolyzed at room temperature to convert the RS group into an OH group, and is then hydrolyzed by acid or alkali to remove the protective substituents on the 2′—OH and 3′—OH groups of the ribose moiety (e.g., the alkylidene group, or aralkylidene group).

The reaction of the present invention may be carried out in a heterogeneous suspension system and a suitable solvent as described above may be added to the reaction mixture. When the phosphorylation reaction is performed, other phosphorylating agents may be added.

The following examples illustrate the invention:

EXAMPLE 1

2.83 g. of guanosine are suspended in 100 ml. of acetone, and 10 g. of S-ethyl dihydrogen phosphorothioate, dissolved in 50 ml. of dimethylformamide, and 15 g. of 2,2-dimethoxypropane are added. Moisture being excluded by a silica gel tube, the reaction mixture is stirred for a day at 50° C. Aqueous 0.4 M sodium bicarbonate solution is added, and the reaction mixture is evaporated under reduced pressure and extracted three times with boiling chloroform (500 ml. of chloroform are used). The extract solution is evaporated under reduced pressure, the residue is dissolved in dilute aqueous ammonia, and the resulting solution is concentrated also under reduced pressure. 3.2 g. of 2′,3′-O,O-isopropylidene-guanosine are obtained.

EXAMPLE 2

2.67 g. of adenosine are suspended in a mixture of 100 ml. of methylethyl ketone and 50 ml. of ethanol, and 10 g. of S-methyl dihydrogen phosphorothioate and 20 g. of 2,2-diethoxybutane are added with stirring, and the mixture is refluxed for ten hours with exclusion of moisture.

The reaction mixture is cooled to room temperature and 2 litres of 0.25 M ammonium bicarbonate in 50% aqueous methanol are added dropwise. The resulting solution is passed through a column having a diameter of 4 cm. packed with 500 ml. of the $HCO_3-$ form of Dowex-1 (trade name) ion exchange resin. The resin is washed with a methanol solution of ammonium bicarbonate.

The effluent and the washings are combined and evaporated under reduced pressure and then dissolved in warm water. The solution is filtered and the filtrate is concentrated under reduced pressure to about 50 ml. The concentrate is heated to dissolve the resulting crystals and is adjusted to pH 6 with N acetic acid.

White crystals separate and are dried to give 2.8 g. of 2′,3′-O,O-s-butylidene adenosine.

EXAMPLE 3

2.44 g. of well dried uridine, 100 ml. of absolute methyl isobutyl ketone and 8 g. of well dried S-2-cyanoethyl dihydrogen phosphorothioate are treated as described in Example 2, except that heating takes place for 10 hours at 70° C.

The solution resulting from treatment with the ion exchange resin (as described in Example 2) is then evaporated under reduced pressure. 2.9 g. of 2′,3′-O,O-(1″,3″-dimethylbutylidene) uridine are recrystallized from ammonium bicarbonate solution.

EXAMPLE 4

2.68 g. of well dried inosine, 100 ml. of absolute methyloctyl ketone, 7 g. of well dried S-p-nitrophenyl dihydrogen phosphorothioate and 50 ml. of ethanol are treated in the manner described in Example 2, except that heating takes place for 10 hours at 70° C. with stirring, to give 2.8 g. of 2′,3′-O,O-(1″-methylnonylidene) inosine.

EXAMPLE 5

2.84 g. of xanthosine, 100 ml. of propionaldehyde, 10 g. of S-butyl dihydrogen phosphorothioate, 20 g. of acetal and 50 ml. of ethanol are treated in the manner described in Example 2 to give 2.6 g. of 2′,3′-O,O-propylidene xanthosine.

EXAMPLE 6

2.43 g. of cytidine, 200 ml. of butyraldehyde, 6 g. of 3-nitropropyl dihydrogen phosphorothionate, 100 ml. of methyl-Cellosolve and 10 g. of ethyl orthoacetate are treated in the manner described in Example 2, except that heating takes place for 10 hours at 70° C. with stirring, to give 2.3 g. of 2′,3′-O,O-butylidene cytidine.

EXAMPLE 7

2.44 g. of well dried uridine, 100 ml. of absolute p-tolualdehyde, 8 g. of well dried S-phenyl dihydrogen phosphorothioate, and 50 ml. of absolute dimethylformamide are treated in the manner described in Example 1, except that the mixture is allowed to stand for a day at 70° C. with stirring. The chloroform extraction solution is evaporated under reduced pressure and 2.9 g. of 2′,3′-O,O-(p-methyl-benzylidene) uridine is recrystallized from aqueous ammonium bicarbonate solution.

EXAMPLE 8

2.54 g. of nicotinamide ribonucleoside, 100 ml. of acetone, 5 g. of S-2-propynyl dihydrogen phosphorothioate, 50 ml. of acetonitrile, and 15 g. of ethyl orthoformate are treated in the manner described in Example 2 to give 2.5 g. of 2′,3′-O,O-isopropylidene nicotinamide ribonucleoside.

EXAMPLE 9

2.67 g. of adenosine, 200 ml. of benzaldehyde, 50 ml. of ethylcellosolve, 7 g. of S-benzyl dihydrogen phosphorothioate and 15 g. of benzalacetone are treated in the manner described in Example 1, except that the reaction mixture is left to stand for 2 days at room temperature with stirring. The chloroform extraction solution is evaporated under reduced pressure. 3.0 g. of 2′,3′-O,O-benzylidene adenosine are obtained by recrystallization of the distillation residue from water.

EXAMPLE 10

2.43 g. of cytidine, 100 ml. of acetone, 50 ml. of ethanol, 6 g. of S-allyl dihydrogen phosphorothioate, and 20 g. of 2-ethoxypropylene are treated in the manner described in Example 2 to give 2.5 g. of 2′,3′-O,O-isopropylidene cytidine.

EXAMPLE 11

2.83 g. of guanosine, 200 ml. of chloroacetone, 50 ml. of dimethylformamide, 9 g. of S-p-nitrobenzyl dihydrogen phosphorothioate, and 10 g. of 2,2-diethoxypropane are treated in the manner described in Example 2. The solution resulting from treatment with the ion exchange resin is evaporated under reduced pressure and the residue is dissolved in dilute aqueous ammonia. The solution is concentrated under reduced pressure to give 2.8 g. of a precipitate, crude 2′,3′-O,O-(1″-chloromethylethylidene) guanosine.

EXAMPLE 12

2.67 g. of adenosine, 200 ml. of cyclopentanone, 50 ml. of dimethylformamide, 8 g. of S-cyclohexyl dihydrogen phosphorothioate, and 20 ml. of propylene oxide are treated in the manner described in Example 1. The chloroform extraction solution is evaporated under reduced pressure. 2.2 g. of 2′,3′-O,O-cyclopentylidene adenosine are obtained by recrystallization of the distillation residue from water.

EXAMPLE 13

2.68 g. of well dried inosine, 100 ml. of phenylacetaldehyde, 50 ml. of chloroform and 8 g. of S-2-cyanoethyl dihydrogen phosphorothioate are treated in the manner described in Example 2, except that heating takes place for 10 hours at 70° C. with stirring, to give 2.8 g. of 2′,3′-O,O-(2″-phenylethylidene)-inosine.

EXAMPLE 14

2.57 g. of well dried 5-amino-4-imidazole-carboxamidine ribonucleoside, 100 ml. of absolute acetone, 100 ml. of absolute dimethylformamide and 10 g. of well dried S-propyl dihydrogen phosphorothioate are treated in the manner described in Example 7 to give 2.6 g. of 2′,3′-O,O-isopropylidene-(5-amino-4-imidazole-carboxamidine ribonucleoside).

EXAMPLE 15

2.58 g. of 5-amino-4-imidazole-carboxamide ribonucleoside, 100 ml. of acetone, 50 ml. of dimethylformamide, 7 g. of S-ethyl dihydrogen phosphorothioate and 20 g. of 2,2-diethoxy-propane are treated in the manner described in Example 2 to give 2.5 g. of 2′,3′-O,O-isopropylidene - (5-amino-4-imidazole-carboxamide ribonucleoside).

EXAMPLE 16

2,83 g. of guanosine, 200 ml. of diethyl ketone, 100 ml. of acetonitrile, 8 g. of 2-nitroethyl dihydrogen phosphorothioate and 10 g. of 2,2-dimethoxypropane are treated in the manner described in Example 2, except that the reaction mixture is stirred for two days at room temperature. The solution resulting from ion exchange resin treatment is evaporated under reduced pressure and the residue is dissolved in dilute aqueous ammonia. The solution is concentrated under reduced pressure and 3.0 g. of 2′,3′-O,O-(1″-ethylpropylidene)-guanosine are obtained as a precipitate.

EXAMPLE 17

Guanosine (2.83 g.) was suspended in 100 ml. of acetone, and 50 ml. of dimethylformamide containing 10 g. of S-ethyl dihydrogen phosphorothioate and 15 g. of 2,2-dimethoxybutane were added to the suspension with stirring. The mixture was refluxed for 10 hours with exclusion of external moisture. After cooling, 100 ml. of anhydrous pyridine were added, and the mixture was evaporated under reduced pressure. The residue was dissolved in anhydrous pyridine and the resulting solution was concentrated to dryness under reduced pressure to effect drying. This drying procedure was repeated three times, and the residue was dissolved in 100 ml. of anhydrous pyridine, 25 g. of N,N′-dicyclohexyl-carbodiimide were added with stirring, and the mixture was allowed to stand at room temperature in its anhyrous state for 48 hours. 200 ml. of water were then added, and the mixture was allowed to stand at room temperature for 1 day, filtered, and washed. The filtrate and washings were combined and evaporated in vacuo until solid. One litre of 50% aqueous acetone contained 9 g. of iodine was added to the solid, allowed to stand for several hours, and the solution was again evaporated under reduced pressure until solid. 2 litres of conc. aqueous ammonia were added to the resulting solid residue and the mixture was left to stand for one night. After removal of the ammonia under reduced pressure, the residue was dissolved in one litre of water. The solution was passed through a resin column (3 cm. in diameter) packed with 500 ml. of the strongly acidic cation exchange resin known as Dowex-50 in the hydrogen form, and the resin was thoroughly washed with water. All the eluates were allowed to stand at room temperature for 3 hours, adjusted to a pH of 4 with aqueous barium hydroxide, and concentrated to a total of 500 ml. under reduced pressure. The pH of the concentrate was adjusted to 7.5 with barium hydroxide, and the precipitates thus deposited were filtered off and washed several times with water to give about 1.5 l. of combined filtrate and washings. Two volumes of ethanol were added to the combined solution, and the precipitates thus deposited were filtered off, washed with ethanol, and dried. There were thus obtained 5.3 g. of barium guanosine-5′-phosphate (having 9 molecules of water of crystallization).

EXAMPLE 18

The introduction of the alkylidene group was carried out at 80° C. according to the procedure of Example 17, using 2.67 g. of adenosine, 100 ml. of diethylketone, 100 ml. of ethanol, 15 g. of S-methyl dihydrogen phosphorothioate, and 20 g. of 2-ethoxypropylene. Further treatment as in Example 17, except that 30 g. of trichloroacetonitrile was used instead of dicyclohexylcarbodiimide, gave the barium salt of adenosine-5′-phosphate. The barium ions were removed from this compound by using the H-form of the cation exchange resin known as Diaion SK No. 1 (available from Mitsubishi Kasei Kogyo K. K., Tokyo) to yield a solution of adenosine-5′-phosphoric acid (5′-adenylic acid). The solution was evaporated under reduced pressure to yield 2.9 g. of addenosine-5′-phosphoric acid having 2 molecules of water of crystallization.

EXAMPLE 19

The introduction of the alkylidene group was performed at 70° C. by the procedure of Example 17, using 2.44 g. of uridine, 150 ml. of methyl isobutyl ketone, 20 g. of S-phenyl dihydrogen phosphorothioate, and 15 ml. of ethyl orthoacetate. The procedure of Example 17, using 25 g. of dimethylcyanamide instead of dicyclohexylcarbodiimide, gave barium uridine-5′-phosphate. Barium ions were removed from this compound by passing its solution through a column of Dowex-50 in the hydrogen form to yield an aqueous solution of the free acid, and the disodium salt was prepared by adding aqueous sodium hydroxide solution and evaporating in vacuo. There was thus obtained 1.8 g. of disodium uridine-5′-phosphate (having 2-molecules of water of crystallization).

EXAMPLE 20

The introduction of the alkylidene group was carried out at 70° C. according to the procedure of Example 17, using 2.68 g. of inosine, 100 ml. of methyl propyl ketone, 100 ml. of ethanol, 20 g. of S-p-nitrophenyl dihydrogen phosphorothioate, and 10 g. of mesityl oxide. After phosphorylation according to the procedure of Example 17 using 15 g. of cyclohexyl isocyanate instead of dicyclo hexylcarbodi-imide, 200 ml. of water were added to the reaction mixture which was then allowed to stand for one night and was then filtered. 2 litres of N/10 NaOH solution and 100 ml. of 3% hydrogen peroxide solution were added to the filtrate and the mixture was left for one night at room temperature. The hydrogen peroxide was decomposed in conventional manner, and the reaction solution was passed through a resin column packed with 500 ml. of Amberlite IR–120 (trade name) in the hydrogen form. The resin was washed thoroughly with water and the combined eluate and washings were left for 5 hours and then neutralized with calcium hydroxide. The resulting precipitate was filtered off and washed several times with water to give a combined filtrate and washings totalling about one litre. To the resulting solution was added twice its volume of ethanol to yield a precipitate, which was filtered off; 2.9 g. of calcium inosine-5′-phosphate, having 6.5 molecules of water of crystallization, were obtained.

EXAMPLE 21

The introduction of the alkylidene group was performed by the procedure of Example 17, using 2.83 g. of guanosine, 100 ml. of propionaldehyde, 15 g. of S-benzyl dihydrogen phosphorothioate, and 20 g. of acetal. Subsequent procedure similar to that in Example 17, using 15 g. of di-p-tolyl-carbodiimide, gave 4.0 g. of barium guanosine-5′-phosphate.

EXAMPLE 22

The procedure of Example 19, using 2.43 g. of well-dried cytidine, 100 ml. of anhydrous butyraldehyde, 100 ml. of anhydrous ethanol, and 10 g. of S-2-cyanoethyl dihydrogen phosphorothiate as the starting materials, and 30 g. of N-methyl dimethyl ketene-imide as the condensing agent in the phosphorylation step, gave an aqueous solution of free cytidine-5′-phosphoric acid (5′-cytidylic acid). The solution was dried in vacuo to yield 1.6 g. of cytidine-5′-phosphate (having one molecule of water of crystallization).

EXAMPLE 23

The introduction of the aralkylidene group was effected at 70° C. by the procedure of Example 18 using 2.67 g. of adenosine, 50 ml. of p-tolualdehyde, 10 g. of S-2-nitroethyl dihydrogen phosphorothioate, 50 ml. of dimethylformamide, and 15 g. of 2,2-diethoxypropane, and then the phosphorylation was performed by using 20 g. of dicyclopentyl carbodiimide in a similar manner to that described in Example 17. Afterwards water (200 ml.) was added to the reaction mixture, which was left for one night. After the filtration of the mixture, the filtrate and washings were combined, about 3 litres of chlorine gas were passed through at 0° C., and the reaction mixture was then dried in vacuo. 2 litres of conc. aqueous ammonia were added to the residue, and the solution was left for one night, and was then evaporated to remove ammonia. The resulting residue was dissolved in one litre of water, and the aqueous solution was then treated in an analogous manner to that of Example 17 to yield the barium salt of adenine-5'-phosphoric acid. Barium adenosine-5'-phosphate was obtained by the procedure similar to that described in Example 17. Treatment with Diaion SK No. 1 in the hydrogen form (a cation exchange resin available from Mitsubishi Kasei Kogyo K.K., Tokyo) removed barium ions to give an aqueous solution of adenosine-5'-phosphoric acid, which was then dried in vauo to yield 2.7 g. of adenosine-5'-phosphate having 2 molecules of water of crystallization.

EXAMPLE 24

The introduction of the alkylidene group was effected at 70° C. by the procedure of Example 17, using 2.83 g. of well-dried guanosine, 50 ml. of anhydrous methyl-n-octylketone 50 ml. of anhydrous ethanol, and 10 g. of well-dried S-butyl dihydrogen phosphorothioate. Subsequently, 20 g. of triethylamine was added, and the mixture was evaporated in vacuo. The residue was dissolved in 100 ml. of anhydrous dimethylformamide and then 10 g. of N-ethyl-5-phenylisoxazoli-um-β'-sulfonate were added with stirring. Afterwards, following the procedure as that in Example 17, 4.1 g. of barium guanosine-5'-phosphate (having 9 molecules of water of crystallization) were obtained.

EXAMPLE 25

The introduction of the alkylidene group was performed at 80° C. by the procedure of Example 17, using 2.54 g. of nicotinamide ribonucleoside, 100 ml. of acetone, 100 ml. of dimethylformamide containing 15 g. of S-ethyl dihydrogen phosphorothioate, and 10 g. of 2,2-dimethoxypropane. Subsequent treatment similar to that in Example 18 using 15 g. of dipropylcarbodi-imide gave 2.2 g. of nicotinamide ribonucleoside-5'-phosphate (having one molecule of water of cystallization).

EXAMPLE 26

The introduction of the alkylidene group was carried out at the reflux temperature, and otherwise according to the procedure of Example 17, using 2.68 g. of inosine, 200 ml. of acetone, 20 g. of S-p-nitrobenzyl dihydrogen phosphorothioate, 50 ml. of ethyl Cellosolve, and 20 g. of ethyl orthoformate. The procedure of Example 20, using 15 g. of di-p-tolylcarbodiimide, gave 3.33 g. of calcium inosine-5'-phosphate (having 6.5 molecules of water of crystallization).

EXAMPLE 27

Calcium nicotinamide ribonucleoside-5'-phosphate was obtained by the procedure of Example 26, using 2.54 g. of nicotinamide ribonucleoside, 100 ml. of acetone, 100 ml. of ethyl Cellosolve, 18 g. of S-benzyl dihydrogen phosphorothioate, and 20 g. of 2,2-diethoxypropane as the starting materials, and 15 g. of dipropylcarbodiimide as the condensing agent in the phosphorylation step. Calcium ions were removed by the procedure of Example 18 and the resulting solution was dried in vacuo. There were thus obtained 2.08 g. of nicotinamide ribonucleoside-5'-phosphate (having one molecule of water of crystallization).

EXAMPLE 28

By the procedure of Example 20, 3.2 grams of calcium inosine-5'-phosphate (having 6.5 molecules of water of crystallization) were obtained, using 2.68 g. of inosine, 100 ml. of benzaldehyde, 10 g. of S-propyl dihydrogen phosphorothiate and 8 g. of phenylbenzoylacetylene as the starting materials, and 20 g. of trichloroacetonitrile as the condensing agent in the phosphorylation step.

EXAMPLE 29

The isopropylidene group was introduced into 2.67 g. of adenosine according to the procedure of Example 17, using 100 ml. of acetone, 12 g. of S-2-propynyl dihydrogen phosphorothioate, 25 ml. of acetonitrile, and 20 g. of acetal. Subsequently, 20 g. of tributylamine were added, and the mixture was evaporated in vacuo. The residue was dissolved in 100 ml. of anhydrous dimethylformamide and then 15 g. of cyclopentyl isocyanate were added with stirring. Then, following the procedure of Example 27, 2.41 g. of adenosine-5'-phosphate (having 2 molecules of water of crystallization) were obtained.

EXAMPLE 30

By the procedure of Example 27, 2.3 g. of adenosine-5'-phosphate (having 2 molecules of water of crystallization) were obtained, using 2.67 g. of adenosine, 100 ml. of diethyl ketone, 50 ml. of dimethylformamide, containing 15 g. of S-isopropyl dihydrogen phosphorothioate, and 15 g. of 2,2-diethoxypropane as the starting materials, and 20 g. of dibutylcarbodiimide as the condensing agent in the phosphorylation step.

EXAMPLE 31

An aqueous solution of uridine-5'-phosphate was obtained by the procedure of Example 27 using 2.44 g. of well-dried uridine, 150 ml. of anhydrous benzaldehyde, and 15 g. of well-dried S-p-cyanophenyl dihydrogen phosphoro-thioate as the starting materials, and 10 g. of bis-O-phenylene-pyrophosphite as the condensing agent in the phosphorylation step. Subsequently, the uridine-5'-phosphoric acid was converted into its disodium salt by adding sodium hydroxide; the resulting solution was evaporated in vacuo to yield 2.5 g. of disodium uridine-5'-phosphate (having 2 molecules of water of crystallization).

EXAMPLE 32

Barium cytidine-5'-phosphate was obtained from 2.43 g. of cytidine, 100 ml. of p-tolualdehyde, 50 ml. of dimethylformamide, 15 g. of S-2-nitroethyl dihydrogen phosphorothioate, and 10 g. of benzalacetone as the starting materials, and 25 g. of dimethylcyanamide as the condensing agent in the phosphorylation step, according to the procedure of Example 20, except that barium hydroxide was used instead of calcium hydroxide. Further treatment similar to that in Example 18 gave 2.0 g. of cytidine-5'-phosphate (having one molecule of water of crystallization).

EXAMPLE 33

By the procedure of Example 20, 3.0 g. of calcium inosine-5'-phosphate were obtained, using 2.68 g. of inosine, 100 ml. of cyclopentanone, 100 ml. of ethanol, 16 g. of S-cyclohexyl dihydrogen phosphorothioate and 10 g. of 2,2-dimethoxypropane as the starting materials, and 15 g. of dicyclohexylcarbodiimide as the condensing agent in the phosphorylation step.

EXAMPLE 34

By the procedure of Example 32, 2.1 grams of cytidine-5'-phosphoric acid were obtained from 2.43 g. of cytidine, 100 ml. of cyclobutyl methyl ketone, 15 g. of S-cyclopentyl dihydrogen phosphorothioate, 50 ml. of acetonitrile, and 10 g. of 2,2-dimethoxypropane as the starting materials, and 15 g. of di-p-tolylcarbodiimide as the condensing agent in the phosphorylation step.

EXAMPLE 35

By the procedure of Example 32, 2.4 grams of adenosine-5′-phosphate were obtained from 2.67 g. of adenosine, 100 ml. of phenylacetaldehyde, 15 g. of S-p-cresyl dihydrogen phosphorothioate, 50 ml. of ethyl Cellosolve, and 20 g. of acetal as the starting materials, and 20 g. of dicyclohexylcarbodiimide as the condensing agent in the phosphorylation step.

EXAMPLE 36

Inosine (2.68 g.) 100 ml. of chloroacetone, 50 ml. of dimethylformamide, 15 g. of S-butyl dihydrogen phosphorothioate, and 15 g. of 2,2-diethoxypropane were heated at 80° C. for 10 hours with stirring to perform the 2′,3′-substitution reaction. The mixture was dehydrated by azeotropic distillation using anhydrous pyridine. The residue was then dissolved in 100 ml. of anhydrous N-methylpiperidine, and 15 g. of di-p-ethylphenylcarbodiimide were added with stirring. After 24 hours standing at room temperature 500 ml. of water were added, and the mixture was allowed to stand for 1 hour. The mixture was treated in an analogous manner to that described in Example 20 to yield a precipitate of calcium inosine-5′-phosphate. Calcium ions were removed by passing through a column of Diaion SK No. 1 in the hydrogen form (a cation exchange resin available from Mitsubishi Kasei Kogyo K.K., Tokyo) to give the free acid solution, and this solution was converted into the disodium salt solution by adding aqueous sodium hydroxide solution and evaporating in vacuo. There were thus obtained 3.2 grams of disodium inosine-5′-phosphate (having 7.5 molecules of water of crystallization).

What I claim is:

1. In a process for synthesizing 2′,3′-O-substituted ribonucleoside by reacting ribonucleoside with a carbonyl compound, the improvement which comprises using as a catalyst an acidic phosphorthio-acid monoester having the formula:

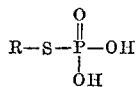

where R is selected from the group consisting of lower aliphatic, lower alicyclic and monocyclic aromatic hydrocarbon radicals, which may have at least one substituent and/or at least one substituted or unsubstituted aliphatic, alicyclic, or aromatic hydrocarbon radical as a side chain.

2. A process for synthesizing 2′,3′-O-substituted ribonucleoside having the formula:

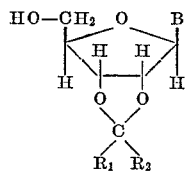

or

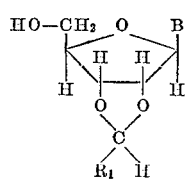

or

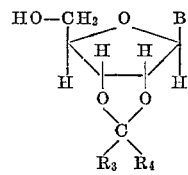

wherein B is an organic base selected from the group consisting of imidazole derivatives, purine derivatives, pyrimidine derivatives and pyridine derivatives, $R_1$ and $R_2$ are selected from the group consisting of aliphatic, cycloaliphatic and aromatic hydrocarbon radicals including substituted and non-substituted ones, and $R_3$ and $R_4$ are selected from the group consisting of aliphatic hydrocarbon radicals, and substituted aliphatic hydrocarbons; which comprises reacting a member of the group consisting of aliphatic, cycloaliphatic and aromatic carbonyl compounds having the formula:

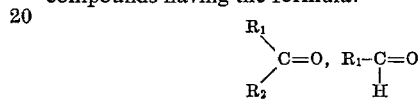

or

wherein $R_1$, $R_2$, $R_3$, and $R_4$ have the same definition as above set forth; with a nucleoside using as catalyst an acidic phosphorothioacid monoester having the formula:

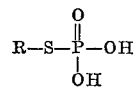

wherein R is selected from the group consisting of lower aliphatic, lower alicyclic and monocyclic aromatic hydrocarbon radicals, which may have at least one substituent and/or at least one substituted or unsubstituted aliphatic, alicycle, or aromatic hydrocarbon radical as a side chain.

3. The process of claim 2 wherein said nucleoside is ribonucleoside.

4. In a process for preparing 2′,3′-O- substituted ribonucleoside by reacting the corresponding 2′—OH, 3′—OH ribonucleoside with a carbonyl compound in the presence of a catalyst and the 2′,3′-O-substituted ribonucleoside subjected to phosphorylation, the improvement which comprises utilizing as a catalyst for both steps of said process an acidic phosphoro-thioacid monoester represented by the following formula:

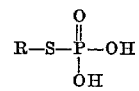

where R is selected from the group consisting of lower aliphatic, lower alicyclic and monocyclic aromatic hydrocarbon radicals, which may have at least one substituent and/or at least one substituted or unsubstituted aliphatic, alicyclic, or aromatic hydrocarbon radical as a side chain, whereby separation of the catalyst from the initial reaction mixture is rendered superfluous.

5. A process for the synthetic preparation of ribonucleoside-5′-phosphates and their salts which comprises:
(1) reacting ribonucleoside in the presence of an acidic phosphoro-thioacid monoester, represented by the following formula:

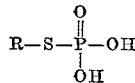

wherein R is selected from the group consisting of lower aliphatic, lower alicyclic and monocyclic aromatic hydrocarbon radicals, which may have at least one substituent and/or at least one substituted or unsubstituted aliphatic, alicyclic, or aromatic hydrocarbon radical as a side chain, with a member of the group consisting of aliphatic, alicyclic, and aromatic carbonyl compound represented by the general formula:

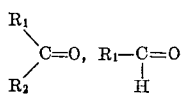

and

wherein $R_1$ and $R_2$ are selected from the group consisting of aliphatic, alicyclic, and aromatic hydrocarbon radical including substituted and unsubstituted ones, and $R_3$ and $R_4$ are selected from the group consisting of aliphatic hydrocarbon radical and substituted aliphatic hydrocarbon radicals to give 2′,3′-O-substituted ribonucleoside represented by the formula:

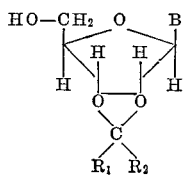

or

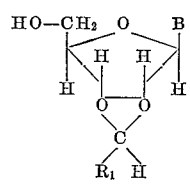

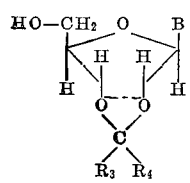

wherein B represents an organic base selected from the group consisting of imidazole derivatives, purine derivatives, pyrimidine derivatives and pyridine derivatives, $R_1$, $R_2$, $R_3$, and $R_4$ are the same as defined above and (2) effecting a phosphorylating reaction at the 5′—OH of the ribonucleoside without isolating the 2′3′-O-substituted ribonucleoside by employing said acidic phosphorothioacid monoester as the catalyst for the phosphorylating reaction.

References Cited
UNITED STATES PATENTS 3,201,389  8/1965  Fujimoto _____ 260—211.5

ELBERT L. ROBERTS, *Primary Examiner.*

J. R. BROWN, *Assistant Examiner.*